United States Patent [19]

Saint-Jean et al.

[11] Patent Number: 4,802,373
[45] Date of Patent: Feb. 7, 1989

[54] MANUAL TRANSMISSION WITH ONE PRIMARY SHAFT AND TWO SECONDARY SHAFTS

[75] Inventors: Alain Saint-Jean, Chateany-Malabry; Michel Bagard, La Garenne-Colombes, both of France

[73] Assignee: Regie Nationale des Usines Renault, Boulogne Billancourt, France

[21] Appl. No.: 922,743

[22] Filed: Oct. 24, 1986

[30] Foreign Application Priority Data

Oct. 25, 1985 [FR] France ............... 85-15852
Oct. 17, 1986 [FR] France ............... 86-14434

[51] Int. Cl.⁴ .................................................. F16H 3/08
[52] U.S. Cl. ..................................... 74/359; 74/331
[58] Field of Search ............... 74/359, 360, 331, 740, 74/701

[56] References Cited

U.S. PATENT DOCUMENTS

| | | | |
|---|---|---|---|
| 4,033,200 | 7/1977 | Stockton | 74/740 |
| 4,116,082 | 9/1978 | Kelbel | 74/359 X |
| 4,377,093 | 3/1983 | Janson | 74/359 X |
| 4,461,188 | 7/1984 | Fisher | 74/331 X |
| 4,476,737 | 10/1984 | Young | 74/331 X |
| 4,523,491 | 6/1985 | Dittmann, Jr. | 74/360 |
| 4,527,447 | 7/1985 | Richards | 74/331 X |
| 4,565,106 | 1/1986 | Sumiyoshi | 74/331 X |
| 4,640,141 | 2/1987 | Knodel et al. | 74/359 X |

FOREIGN PATENT DOCUMENTS

| | | | |
|---|---|---|---|
| 2291054 | 11/1974 | France. | |
| 2248746 | 5/1975 | France | 74/331 |
| 2553043 | 4/1984 | France. | |
| 0094657 | 6/1983 | Japan | 74/359 |
| 2069635 | 8/1981 | United Kingdom | 64/331 |
| 2081825 | 2/1982 | United Kingdom | 74/331 |

Primary Examiner—Leslie A. Braun
Assistant Examiner—David Novais
Attorney, Agent, or Firm—Oblon, Fisher, Spivak, McClelland & Maier

[57] ABSTRACT

A manual transmission comprises a primary shaft and first and second secondary shafts placed parallel with the primary shaft. First speed, second speed, fifth speed and reverse idling gears are rotatably mounted on the first secondary shaft. A first double synchronizer is mounted on the first secondary shaft between the first speed idling gear and the second speed idling gear. A second double synchronizer is mounted on the first secondary shaft between the fifth speed idling gear and the reverse idling gear. Third and fourth speed idling gears are rotatably mounted on the second secondary shaft. A third double synchronizer is mounted on the second secondary shaft between the third speed idling gear and the fourth speed idling gear. A third speed gear is mounted on the primary shaft and meshes with the third speed idling gear, the third speed gear being axially positioned between the teeth of the reverse idling gear and the second double synchronizer. A fourth speed gear is mounted on the primary shaft and drivingly meshes with both the fourth speed idling gear and the fifth speed idling gear. A reverse intermediate gear is mounted on a fixed intermediate pin and meshes with the reverse idling gear.

2 Claims, 3 Drawing Sheets

MANUAL TRANSMISSION WITH ONE PRIMARY SHAFT AND TWO SECONDARY SHAFTS

BACKGROUND OF THE INVENTION

1. Field of the Invention

This invention relates to a manual transmission with three shafts, which makes it possible to have five forward speeds and one reverse, and which is applied particularly to motor vehicles.

2. Background of the Related Art

Numerous three-shaft manual transmissions are known, such as those with a first secondary shaft which makes it possible with the primary shaft to have a standard manual transmission with four forward speeds and one standard reverse with sliding gear, and to which is merely added a second secondary shaft, on which a fifth speed gear is placed, which is driven by the same gear of the primary shaft is the fourth speed gear.

Other types of manual transmissions are known which provide, on a first secondary shaft, the gears of first and second speeds and reverse, while the second secondary shaft has the gears of third, fourth, and fifth forward speed. In these compact structures the idling gears of the first speed and third speed are driven by the same primary gear, while the idling gears of second speed and fourth speed are driven by the same gear of the primary shaft. This arrangement, for the changing of the speeds, leads to having two output movement gears of the secondary shafts, called drive gears, which are different. This structural characteristic locks the transmission at all levels to a spacing or ratio between the first and fourth speed; and consequently, for the intermediate spacing between the first and second speed, between the second and third speed, and between the third and fourth speed.

In addition, none of these known transmissions makes it possible to have a synchronized reverse of a small size (standard reverse, i.e., with a sliding gear).

SUMMARY OF THE INVENTION

The object of this invention is to provide a manual transmission with three shafts, which makes it possible to have five forward speeds and one synchronized reverse with as small an axial size as possible, while making possible a certain variation of the possible ratios of the transmission for a given structure and dimensions.

According to an embodiment of the invention, the manual transmission with a primary shaft and two secondary shafts includes a a first secondary shaft having the first, second, fifth forward speed and reverse idling gears with a double synchronizer placed between the first speed and second speed gears, and between the fifth speed and reverse gears.

The second secondary shaft has the third and fourth forward speed idling gears with a double synchronizer placed between the third speed and fourth speed gears.

The third speed gear is placed between the toothing of the reverse idling gear of the first secondary shaft, and the double synchronizer of fifth speed and reverse.

According to an embodiment of the invention, the fourth forward speed idling gear of the second secondary shaft and the fifth forward speed idling gear of the first secondary shaft are both driven by the same gear of the primary shaft.

According to an embodiment of the invention, the drive gear of the second secondary shaft is identical with the drive gear of the first secondary shaft.

According to an embodiment of the invention, the reverse intermediate gear is mounted on an intermediate pin which is solid with the clutch housing, and which is mounted with overhang in this clutch housing.

The manual transmission with three shafts according to the invention thus exhibits the advantage of making possible an adaptation of the shifting between the first, second, third and fourth speeds. Moreover, this transmission offers the possibility of having two drive gears, at the output of the secondary shafts, which are identical. This arrangement makes it possible to have, on the one hand, a better standardization and a lower cost, and on the other hand, a greater ease of adapting the movement drive ratios on the differential ring gear depending on the vehicle to be equipped. Actually, for this latter point, it is necessary to change only the dimensions of two complementary elements: the differential ring gear and its drive gear; this drive gear being identical for each of the secondary shafts. The drive ratio is the same for each of the secondary shafts, and thus we return to the simple case of a manual transmission with two shafts. Finally, the manual transmission with three shafts according to the invention makes it possible to have a synchronized reverse, which has a very small axial size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
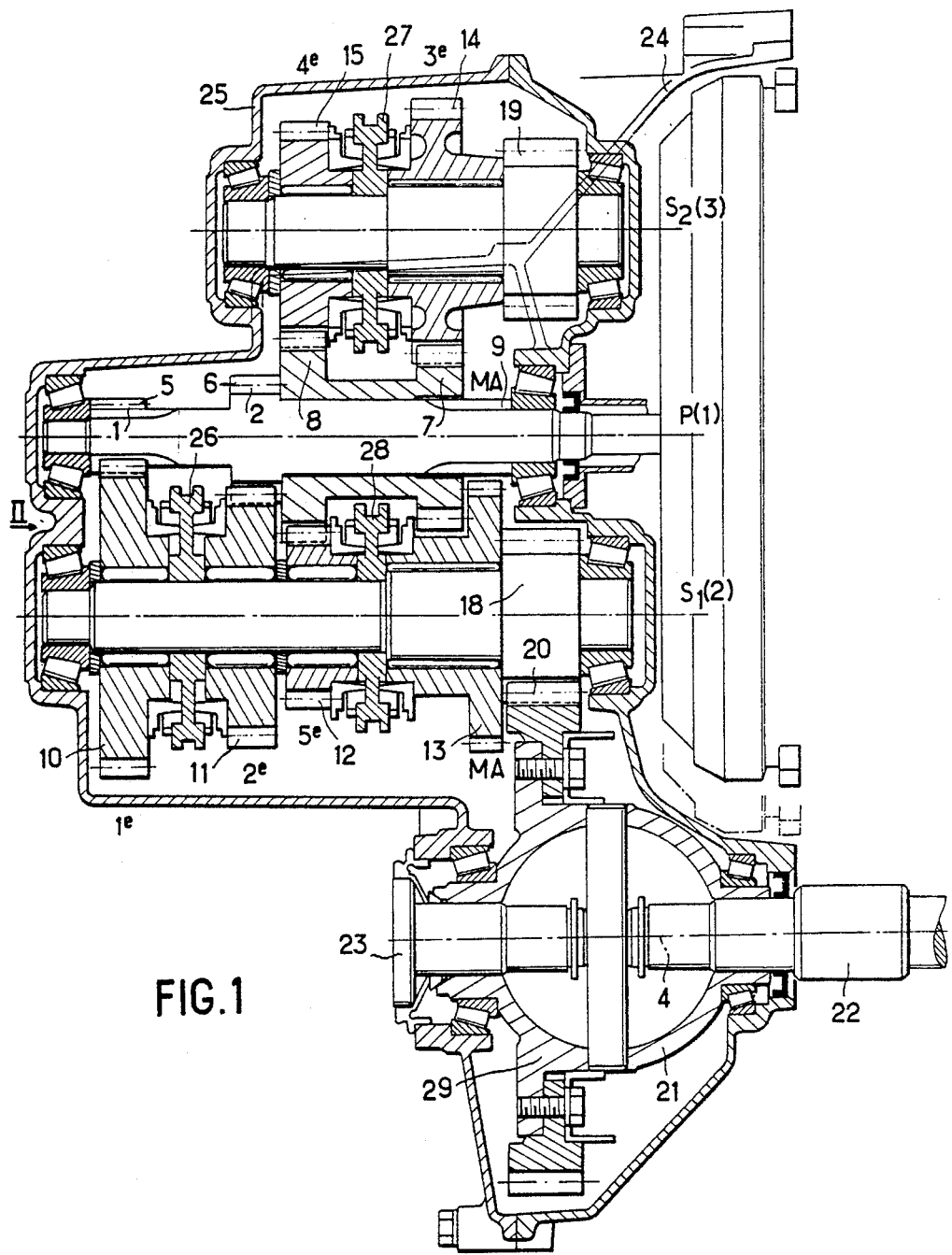
FIG. 1 is a longitudinal view developed in section of a transmission according to the invention.

Seen in FIG. 1 is a manual transmission with three (P) shafts according to the invention; this transmission comprises a primary shaft 1 which drives either a first secondary ($S_1$) shaft 2 or a second secondary ($S_2$) shaft 3. Primary shaft 1 and the two secondary shafts 2 and 3 mounted with differential 29 are in a casing defined between a clutch housing 24, and in a mechanism housing 25. Clutch housing 24 is mounted directly on the engine, and it receives mechanism housing 25 which is fastened to the clutch housing 24. Each of the primary 1 and secondary shafts 2 and 3 and differential 29 are placed in a manner known in the art by rollers in these housings.

Primary shaft 1 carries first speed gear 5 and second speed gear 6. A unit of third speed gear 7 and fourth speed gear 8 are associated with one another in a double gear, and this latter unit is mounted on primary shaft 1. This unit of gear 7 and 8 is rotationally fixed to primary shaft 1 by means of the toothing of a reverse gear 9 which is machined directly in said primary shaft 1.

First secondary shaft 2 carries a first speed idling gear 10, a second speed idling gear 11, a fifth speed idling gear 12, and a reverse idling gear 13. These gears 10, 11, 12 and 13 are mounted by means of needle bearings on first secondary shaft 2. This first secondary shaft 2 has at its end, immediately after reverse idling gear 13, a movement output gear called drive gear 18. A double synchronizer 26 is placed on first primary shaft 2 between first speed idling gear 10 and second speed idling gear 11. Another double synchronizer 28 is placed between fifth speed idling gear 12 and reverse idling gear 13.

The second secondary shaft has a third speed idling gear 14 and a fourth speed idling gear 15. These idling gears 14 and 15 are mounted on second secondary shaft 3 by means of needles according to a device known in the art. A movement output gear called drive gear 19 is placed on second secondary shaft 3. This drive gear 19 is immediately after third speed idling gear 14. A double synchronizer 27 is placed between third speed idling gear 14 and fourth speed idling gear 15.

Figure 2:
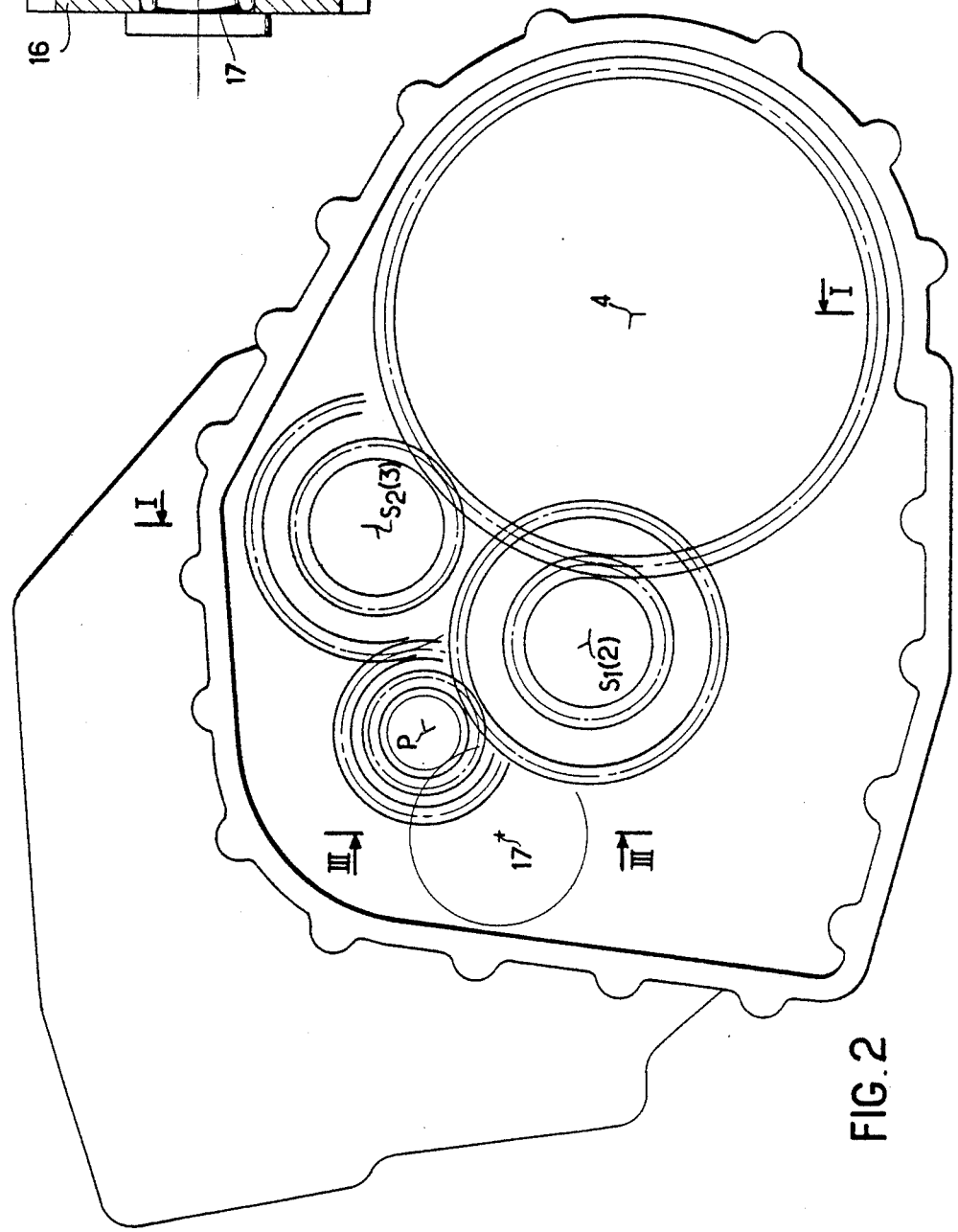
FIG. 2 is a partial view along II of FIG. 1.

Drive gear 18 of first secondary shaft 2 meshes with ring gear 20 of differential 29. In the same way, drive gear 19 of second secondary shaft 3 meshes with ring gear 20 of differential 29. In FIG. 2, the arrangement of the various pins of primary shaft 1, the two secondary shafts 2 and 3 and of pin 4 of differential 29 can be seen. Ring gear 20 of differential 29 is mounted on housing 21 and the rotation thereof is sent to the wheels by transmission outputs 22 and 23.

Figure 3:
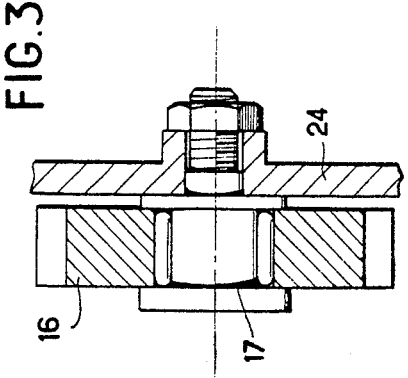
FIG. 3 is a partial section III—III of FIG. 2.

The reverse device is seen in FIGS. 2 and 3. This device comprises a reverse intermediate pin 17 which is mounted with overhang in clutch housing 24. This intermediate pin 17 carries a reverse intermediate gear 16 which is mounted to idle on shaft 17 by means of pins.

The transmission according to the invention is such that fourth speed idling gear 15 of second secondary shaft 3, and fifth speed idling gear 12 of first secondary shaft 2 are both driven by the same gear 8 of primary shaft 1.

In addition, the structure according to the invention and the arrangement of the pins of the first 1 and secondary shafts 2 and 3 and the pin 4 of differential 29 makes it possible to have a drive gear 19 of second secondary shaft 3, which is identical in ratio with drive gear 18 of the first secondary shaft.

The structure according to the invention is particularly advantageous because it provides that third speed gear 7 of primary shaft 1 is placed between the toothing of reverse idling gear 13 of first secondary shaft 2, and double synchronizer 28 of fifth speed and reverse. Actually, this arrangement makes it possible to obtain as small an axial size as possible, and on the other hand, makes it possible to have a synchronized reverse.

Moreover, the transmission structure according to the invention makes it possible to obtain with the same center distances between primary shaft 1 and the two secondary shafts 2 and 3, ratio or spacing between the fourth and fifth speeds which can vary from 1, 15 to 1, 35 by acting on the mutual ratios of the masking gears 8, 12 and 15 with constant center distances. This makes it possible to obtain gear changes with different transmissions from the same housing structure.

Figure 4:
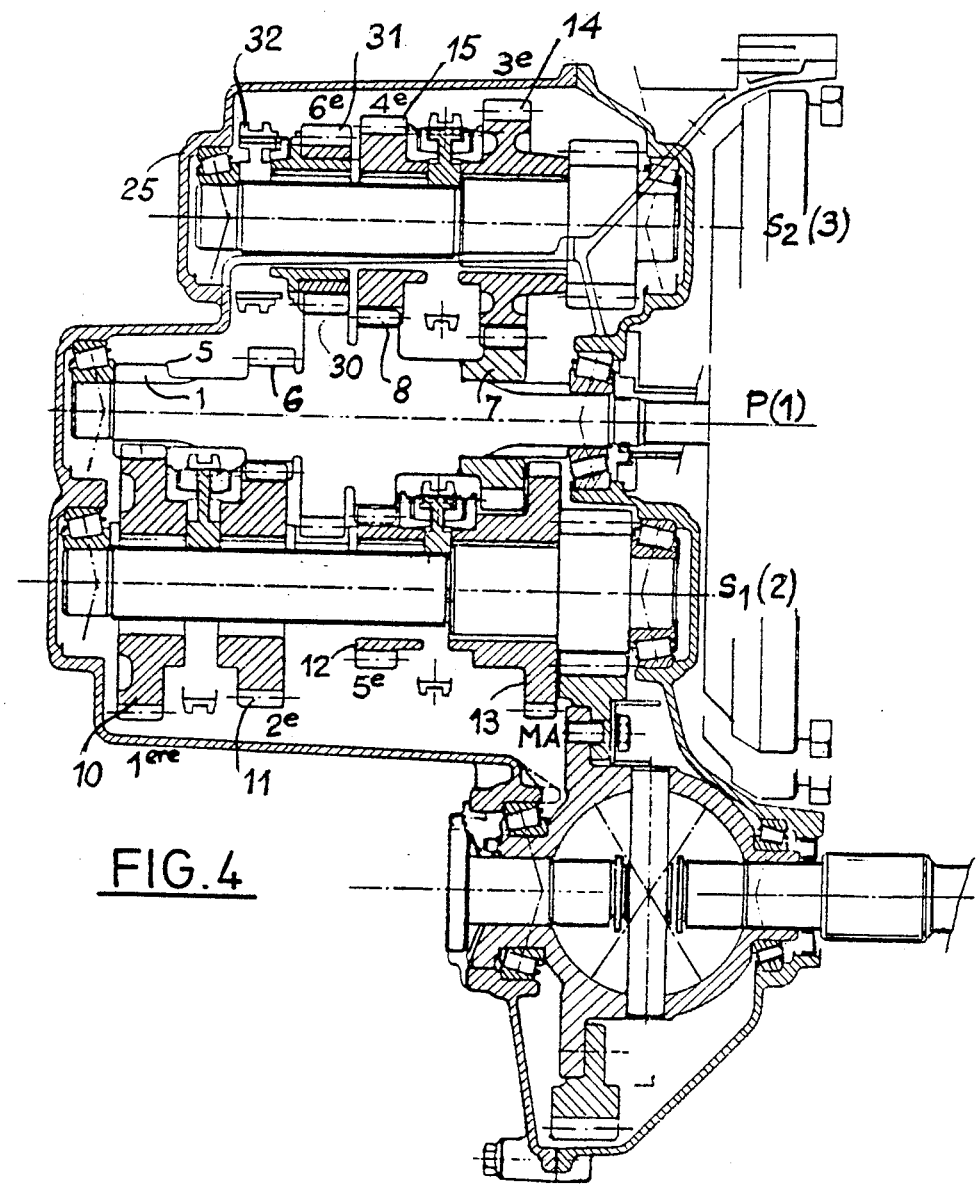
FIG. 4 is a longitudinal view developed in section of a transmission according to a second embodiment of the invention.

A variant of the invention is shown in FIG. 4.

A sixth speed idling gear 31 is mounted at the end of the second secondary shaft 3, i.e., after fourth speed idling gear 15.

A simple synchronizer 32 is fastened to sixth speed idling gear 31 and the unit is placed between the end roller and said fourth speed idling gear 15.

The sixth speed idling gear 31 meshes with a sixth speed gear 30 of primary shaft 1. Said sixth speed gear 30 is placed between fourth speed gear 8 and second speed gear 6 of primary shaft 1.

Obviously, numerous modifications and variations of the present invention are possible in light of the above teachings. It is therefore to be understood that within the scope of the appended claims, the invention may be practiced otherwise than as specifically described herein.

We claim:

1. A manual transmission comprising:
a primary shaft;
first and second secondary shafts;
first speed, second speed, fifth speed and reverse idling gears rotatably mounted on said first secondary shaft;
a first double synchronizer mounted on said first secondary shaft between said first speed idling gear and said second speed idling gear;
a second double synchronizer mounted on said first secondary shaft between said fifth speed idling gear and said reverse idling gear;
third and fourth speed idling gears rotatably mounted on said second secondary shaft;
a third double synchronizer mounted on said second secondary shaft between said third speed idling gear and said fourth speed idling gear;
a third speed gear mounted on said primary shaft and meshing with said third speed idling gear, said third speed gear being axially positioned between teeth of said reverse idling gear and said second double synchronizer;
a first drive gear mounted on said first secondary shaft and a second drive gear mounted on said second secondary shaft, and a differential ring gear meshing with both of said first and second drive gears, wherein said first and second drive gears both have identical numbers of teeth;
a fourth speed gear mounted on said primary shaft and drivingly meshing with both said fourth speed idling gear and said fifth speed idling gear;
a sixth speed idling gear rotatably mounted on an end of said second secondary shaft;
a simple synchronizer mounted at said end of said second secondary shaft;
a second speed gear mounted on said primary shaft; and
a sixth speed gear mounted on said primary shaft between said second and fourth speed gears and meshing with said sixth speed idling gear.

2. A manual transmission comprising:
a primary shaft;
first and second secondary shafts;
first speed, second speed, fifth speed and reverse idling gears rotatably mounted on said first secondary shaft;
a first double synchronizer mounted on said first secondary shaft between said first speed idling gear and said second speed idling gear;
a second double synchronizer mounted on said first secondary shaft between said fifth speed idling gear and said reverse idling gear;
third and fourth speed idling gears rotatably mounted on said second secondary shaft;
a third double synchronizer mounted on said second secondary shaft between said third speed idling gear and said fourth speed idling gear;

a third speed gear mounted on said primary shaft and meshing with said third speed idling gear, said third speed gear being axially positioned between teeth of said reverse idling gear and said second double synchronizer;

a reverse intermediate gear mounted on a fixed intermediate pin and meshing with said reverse idling gear;

a fourth speed gear mounted on said primary shaft and drivingly meshing with both said fourth speed idling gear and said fifth speed idling gear;

a sixth speed idling gear rotatably mounted on an end of said second secondary shaft;

a simple synchronizer mounted at said end of said second secondary shaft;

a second speed gear mounted on said primary shaft; and a sixth speed gear mounted on said primary shaft between said second and fourth speed gears and meshing with said sixth speed idling gear.

* * * * *